UNITED STATES PATENT OFFICE.

JOHN W. DIXON, OF PHILADELPHIA, PENNSYLVANIA.

IMPROVEMENT IN THE MANUFACTURE OF PAPER-PULP.

Specification forming part of Letters Patent No. 45,321, dated December 6, 1864.

*To all whom it may concern:*

Be it known that I, JOHN W. DIXON, of the city of Philadelphia and State of Pennsylvania, have invented a new and useful Improvement in the Manufacture of Paper; and I do hereby declare that the following is a full and exact description thereof.

My improved process has reference to an economical application of caustic alkali in the manufacture of straw and wood pulp.

Heretofore paper-pulp has been made from straw and from wood by the use of caustic alkali, generally caustic soda. In the manufacture of of pulp from wood caustic alkali of a considerable strength has always been required, say, with caustic soda, a strength of 16° where the solution of caustic soda was applied under pressure. The use of this high degree of strength of solution rendered the manufacture of pulp from wood too expensive for practical purposes unless an expensive evaporating process and a burning and purifying of the residue was resorted to for the purpose of recovering the caustic soda from the residual solution. Caustic soda has also been heretofore used for the purpose of making pulp from straw, it being necessary to use it, however, of a low degree of strength—say about 6° of Baumé. The waste of refuse alkali from the straw pulp solution has not been deemed to contain sufficient alkali to warrant evaporating it down, and the difficulty of burning out or freeing the solution from glutinous matter was such that this refuse had been heretofore thrown away.

I have discovered that the resulting or refuse alkaline solution, after pulping wood, although inapplicable to further wood pulping, is not impaired in strength nor injured by the presence of glutinous or other matter to such an extent as to prevent its being at once used for pulping straw; and, also, that the alkaline solution which has been used of the proper strength for pulping straw, although not fit for again being used to make first-class straw pulp, yet is well fitted for being again used upon straw with economy to produce a cheap and coarse article of pulp fit for wrapping-paper or straw-boards.

I have applied this discovery to the manufacture of paper, as follows: I treat my wood fiber, after being chipped or cut by any ordinary chipping or planing cutter, with forty gallons of solution of caustic soda of a strength of from 16° to 20° Baumé's hydrometer to every one hundred pounds of wood, and with a heat varying from 212° to 300° Fahrenheit, and upward, according to the alkaline strength of the solution employed, and for about six hours, depending on the strength of the solution and on the heat at which the solution is employed. After the wood has been pulped I drain off carefully the solution of caustic soda, and without any further chemical treatment apply it to the pulping of ordinary straw, as follows: I find that I obtain as a residue after the treatment of the wood, as above, of thirty gallons of alkaline solution of a strength of 12° Baumé or upward, according to the strength originally used in treating wood. This I dilute one-half, producing sixty gallons of a strength of 6° Baume, and not injured by the pressure of glutinous matter for the subsequent treatment of straw. I apply this liquor in the proportion of sixty gallons (at 6° Baumé, or thereabout) to two hundred pounds of straw at from 212° to 300° of heat, and for about (6) six hours, more or less, depending on the heat and strength of solution. I thus obtain as good an article of straw pulp as though fresh caustic soda had been used.

I have found that there is nothing in the first or wood treatment which interferes with the second or straw treatment, as above described. Hence I can use with economy as strong a solution of alkali in the first or wood treatment as I desire, and thus work through lower ranges of temperature than was heretofore economically practicable, and at the same time avoid on the one hand the loss of caustic alkali, and on the other hand the use of expensive apparatus and process to secure its recovery. Of course I can obtain similar economy when it is desired to work at the higher ranges of temperature now preferred, inasmuch as I dispense with the evaporating and burning process.

It is also known that a mixture of straw and wood pulp produces better paper than either material separately would produce, and hence the manufacture of both kinds of pulp is advantageous in view of the quality of the ultimate product.

I have also applied the discovery that the refuse alkaline liquor from straw-pulping does not contain sufficient glutinous or other foreign matter to prevent its being used for making a straw-pulp of an inferior quality suitable for making coarse paper in the following manner: I take about fifty gallons of refuse liquor from the first straw pulping and apply it again to one hundred pounds of straw at 212°, and obtain much better pulp than has heretofore been obtained in the usual treatment of straw with lime for making coarse paper, &c.

Instead of treating straw as described in the above processes, the waste or residual liquor obtained from wood may be applied to sorghum, cornstalks, husks, bagasse, reeds, hemp, flax, manila, or other equivalent material requiring a low degree of alkaline solution as compared with wood for its efficiency, the said articles being deemed by me equivalents for straw in both the above-described processes.

Having thus described my improvement, what I claim as my invention, and desire to secure by Letters Patent, is—

1. The process of manufacturing pulp from wood and from straw (or the equivalent of straw, above described) in conjunction by making use of the waste liquor of the wood-pulping process to pulp the straw or its equivalent, as above described.

2. The process of manufacturing two grades of pulp from straw or its equivalent, as above described, in conjunction by using the waste liquor of the straw pulp or its equivalent first obtained to manufacture coarse pulp from straw or its equivalent for binders' boards, wrapping-paper, &c.

3. The process of pulping wood by caustic soda, and then using the residual liquor to treat straw or its equivalent, and again using the second residual liquor to form an inferior grade of pulp from straw or its equivalent, as above described.

JNO. W. DIXON.

Witnesses:
 GEO. BUCKLEY,
 GEO. HARDING.